July 3, 1956  R. S. GAUGLER  2,752,762
FREEZING DEVICE

Filed June 24, 1954  2 Sheets-Sheet 1

INVENTOR.
Richard S. Gaugler.
BY
R. R. Candor.
His Attorney.

July 3, 1956 R. S. GAUGLER 2,752,762
FREEZING DEVICE
Filed June 24, 1954 2 Sheets-Sheet 2

INVENTOR.
Richard S. Gaugler.
BY
R. R. Candor
His Attorney.

United States Patent Office 2,752,762
Patented July 3, 1956

2,752,762

FREEZING DEVICE

Richard S. Gaugler, Dayton, Ohio, assignor to General Motors Corporation, Detroit, Mich., a corporation of Delaware Application June 24, 1954, Serial No. 438,897

6 Claims. (Cl. 62—108.5)

This invention relates to freezing devices and particularly to a unitary device wherein a flexible ice tray is twisted to move inflexible grid walls therein.

I am aware of the fact that many freezing devices of the type including a tray and grid therefor in which water is to be frozen into ice blocks have previously been proposed. The two primary desirable characteristics of such a device is that of good or high conduction of heat therefrom so that the water will be more quickly frozen and that of easily freeing ice blocks from their compartment walls to facilitate an ice block harvesting operation. Others have provided a substantially rigid metal tray and disposed a flexible grid or a lever actuated rigid movable walled grid in the tray, a flexible tray with a flexible or bendable rubber grid therein and more recently a unitary or combined twistable tray and grid wholly formed of rubber or flexible plastic material. Whenever a tray or grid and especially both of a freezing device is or are formed of non-metallic material the period of time required to freeze water in the device is lengthened and this destroys one of the desirable characteristics thereof. An ice tray having a grid therein provided with movable walls and a lever or the like for moving the walls is a complicated structure, difficult to assemble and is expensive to produce. I contemplate the provision of a freezing device of the ice tray and grid type which is, in addition to being of low manufacturing cost, constructed entirely of material of good heat conducting properties and is also manipulated in a unique and easy manner to free ice blocks from compartments therein.

An object of my invention is to provide an improved freezing device of the tray and grid type for the production of ice blocks.

Another object of my invention is to provide a substantially shallow all-metal freezing device of the tray and grid type wherein water placed in the same is spread out in a thin layer in compartments therein so that heat can be conducted from the water through the metal of the tray and grid to more rapidly freeze the water in the production of ice in cubelet form.

A further object of my invention is to provide a unitary ice tray and grid structure wherein the tray is formed of flexible metal capable of being twisted from end to end thereof and wherein rigid walls of a grid in the tray are shiftable relative thereto upon twisting the tray for freeing ice blocks from compartments in the structure.

A still further object of my invention is to provide a shallow elongated flexible freezer type tray with rigid grid walls extending continuously thereacross and loosely disposed therein attached at only two points to opposed upright sides of the tray whereby the rigid walls are shiftable in a plurality of directions relative to the tray in response to torsional twisting movement of the flexible tray about its geometric center.

A more specific object of my invention is to provide a unitary freezing device including an elongated flexible metal tray having rigid tapered grid walls therein attached to the tray at only transversely aligned pivot-like points along the opposed upright sides thereof whereby the opposed attaching points are movable in opposite directions with respect to one another upon twisting the flexible tray from end to end for imparting a rocking or tilting movement to the grid walls and a bodily shifting thereof angularly relative to the tray in a direction along the length thereof to loosen ice blocks from the compartments in the device.

Further objects and advantages of the present invention will be apparent from the following description, reference being had to the accompanying drawings wherein a preferred form of the invention is clearly shown.

Figure 1:
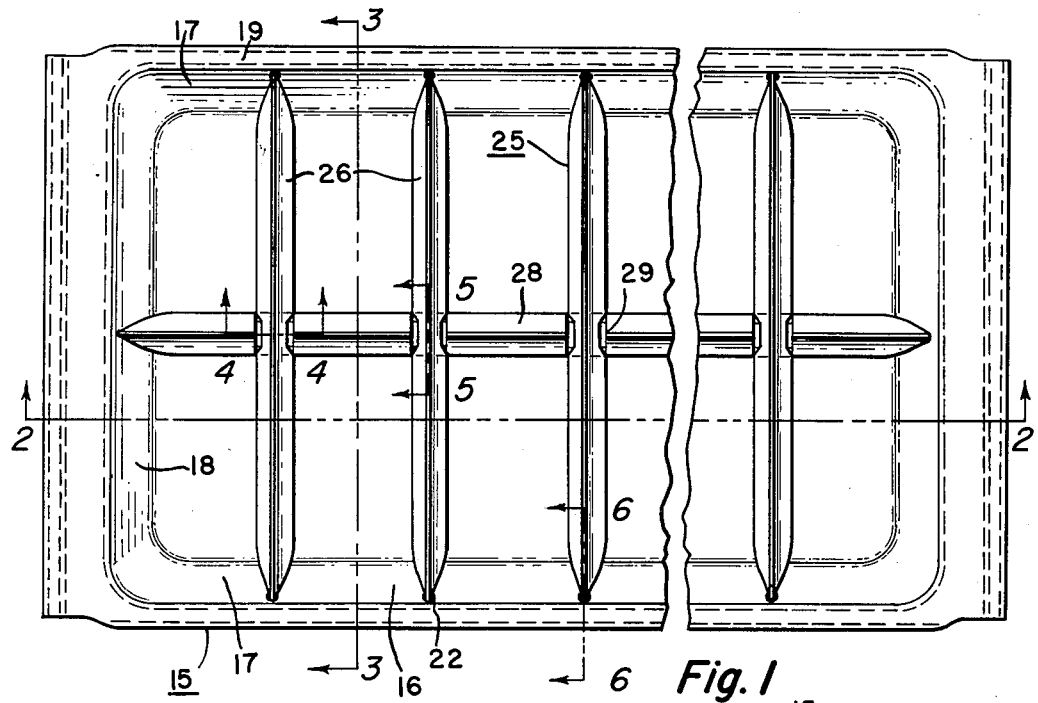
Figure 1 is a top view of my improved freezing device.
Figure 2:
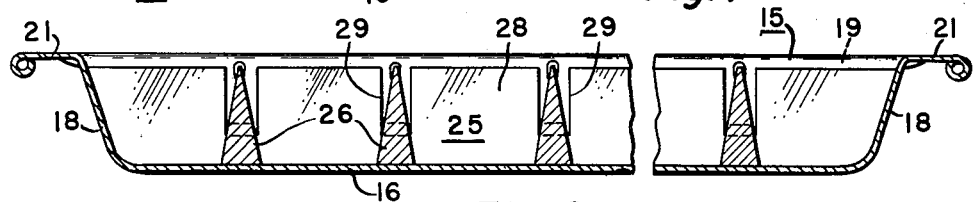
Figure 2 is a longitudinal vertical sectional view through the freezing device taken on the line 2—2 of Figure 1.
Figure 3:
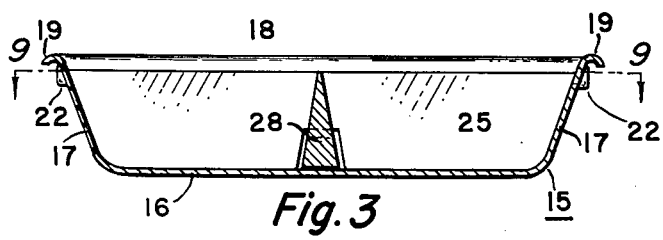
Figure 3 is a transverse vertical sectional view through the freezing device taken on the line 3—3 of Figure 1.
Figure 6:
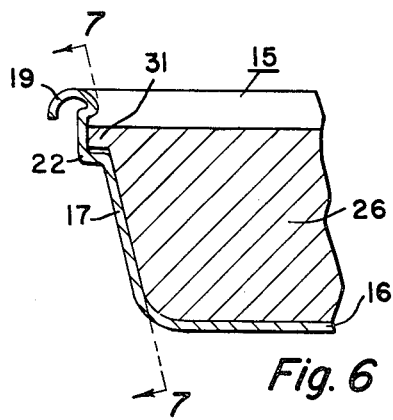
Figure 6 is an enlarged fragmentary vertical sectional view taken on the line 6—6 of Figure 1 showing the anchoring of a transverse grid wall to the side of the tray of the device.
Figure 7:
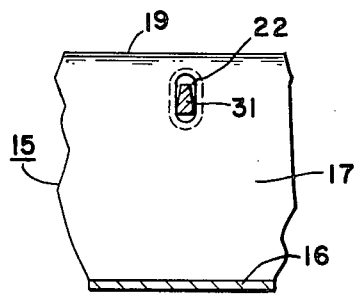
Figure 7 is a fragmentary sectional view taken on the line 7—7 of Figure 6 showing a projection on the end of one of the transverse grid walls fitted in a recess in a side of the tray.

Referring now to the drawings I show in Figures 1 to 3 thereof a unitary freezing device of the type comprising a flexible metal tray adapted to receive water to be frozen. The freezing device also comprises a grid structure disposed in the tray for dividing the interior thereof into a plurality of ice block or cubelet forming compartments. The flexible metal tray, generally represented by the reference character 15, is elongated, is relatively shallow and includes a bottom wall 16, upwardly extending and outwardly diverging side and end walls 17 and 18 respectively. The top of side walls 17 of tray 15 are rolled or curled over to provide a rim 19 therealong. A continuation of the metal of rim 19, as at 21, forms handle-like grips on each end wall 18 of tray 15 to facilitate twisting thereof as will be hereinafter described. Tray 15 is preferably formed or stamped from thin sheet aluminum of approximately $\frac{1}{32}$ inch thickness and is polished and anodized. The present elongated tray 15 is provided with a plurality of dimples formed in each of its sides or side walls 17 and these dimples are arranged in spaced apart relation along the length thereof. The dimples form inwardly facing recesses 22 which are located at the most convenient or desired height in the upright sides of tray 15 to produce movement or shifting of rigid walls of a grid therein in the manner to be hereinafter described. The spaced apart recesses 22 in sides 17 of tray 15 are preferably vertically elongated (see Figures 6 and 7) for a purpose to be hereinafter more fully described.

Figures 4, 5:
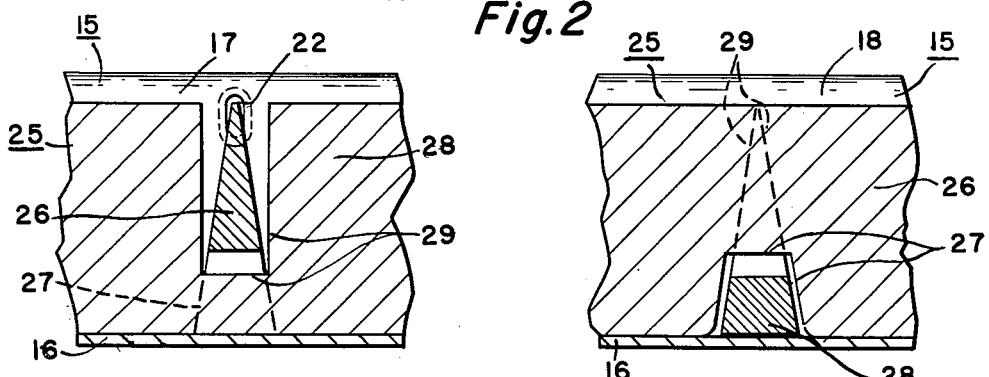
Figure 4 is an enlarged fragmentary vertical sectional view taken on the line 4—4 of Figure 1 showing walls of the grid movably interlocked together with one wall loosely anchored to the tray.
Figure 5 is an enlarged fragmentary vertical sectional view of the interlocked grid walls of the device and is taken on the line 5—5 of Figure 1.

The grid structure, generally represented by the reference character 25, disposed in tray 15 includes a plurality of inflexible walls 26 extending transversely continuously across the tray in spaced apart relation to one another and dividing the interior of tray 15 into a plurality of compartments in which water is to be frozen into ice blocks or cubelets. Each transverse wall 26 may be formed of aluminum or they may be of any suitable moulded plastic material such, for example, as polystyrene. Each transverse rigid grid wall 26 has its sides tapered toward one another from the bottom to the top thereof and is provided centrally of its ends with a cut out slot 27 extending upwardly from its bottom (see Figures 4 and 5). A rigid longitudinal grid wall 28, similar in cross sectional contour to the plurality of transverse walls 26, is loosely disposed in tray 15 and is provided with a plurality of spaced apart cut out slots 29 extending downwardly from its top (see Figures 2, 3 and 4). Longitudinal wall 28 is placed beneath the plurality of tranverse walls 26 with the web portion of walls 26 above the slot 27 therein fitting over the web portion of walls 28 below the slot 29 therein (see Figures 3 and 4). This interlocks the grid walls 26 and 28 together and prevents longitudinal wall 28 from being removed from tray 15 after the walls 26 are anchored to the tray. Each end of each transverse wall 26 is provided with an integral projection or projecting ear 31 which fit into transversely aligned recesses 22 in the opposed upright sides 17 of tray 15 (see Figures 6 and 7) and forms points of attachment of walls 26 to upright sides of the tray. After longitudinal wall 28 has been placed in tray 15 the cross or transverse walls 26 are located thereover and are pressed or snapped into position within the tray. The sides of tray 15 may be temporarily sprung to permit the projections or projecting ears 31 on the ends of walls 26 to slide along the inner surface of side walls 17 of tray 15 intermediate the top of the tray and the upper portion of the dimples providing the recesses 22 and to be received in transversely aligned recesses 22. In this manner the plurality of walls 26 and longitudinal wall 28 therebelow are locked in place within tray 15 against removal therefrom. It is to be understood that the recesses in sides of tray 15 could, if desired, be in the form of vertically elongated holes and if placed near the top of the tray sides 17 they may serve to drain excess water out of the tray to establish a positive predetermined level of water in the tray at substantially the top of the grid walls 26 and 28 therein. All of the grid walls lie loosely in tray 15 and are loosely interlocked together for movement relative to one another and are bodily shiftable relative to the tray, without becoming detached therefrom, in order to carry out the objects of the invention.

In the present disclosure the two pivot or anchoring points of attachment of each cross wall 26 to the upright sides 17 of tray 15 permit a slight elevation of these walls relative to the tray. Any twisting of the flexible metal tray 15 from end to end thereof will also move the grid wall attaching points, openings or recesses 22 in the sides of the tray, in opposite directions with respect to one another to cause shifting of rigid transverse walls 26 bodily and angularly relative to the tray in a direction along the length thereof. The movement of the inflexible walls 26 both angularly and upwardly relative to tray 15 imparts a rocking or tilting movement to the transverse walls in the tray. Thus by torsionally twisting the flexible metal tray 15 about its geometric center, represented by the reference character 35 in Figure 8 of the drawings, I am enabled to produce movement of the transverse rigid walls in a plurality of directions. It is to be understood that only a slight movement of walls bounding an ice block compartment in a freezing device of the type disclosed is all that is necessary to break the bond between an ice block in the compartment and its walls for freeing the blocks or cubes therefrom.

Figure 8:
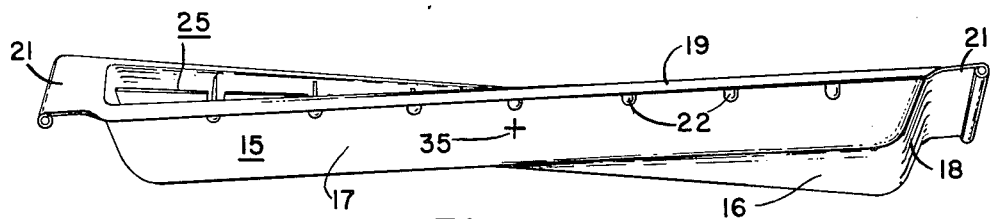
Figure 8 is a view illustrating the freezing device torsionally twisted about its geometric center to cause rigid walls of the grid in the tray thereof to be shifted in a plurality of directions for freeing ice blocks from walls of the compartments.
Figure 11:
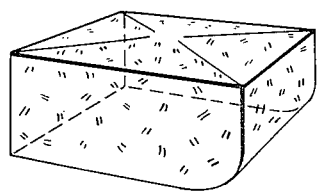
Figure 11 is a perspective view of a block of ice harvested from the present freezing device.
Figure 9:
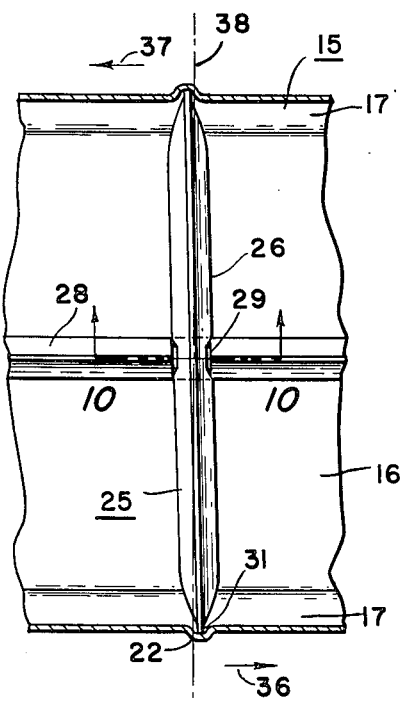
Figure 9 is an enlarged sectional view taken on the line 9—9 of Figure 3 illustrating one of the transverse grid walls shifted in a plurality of directions when the tray of the freezing device is twisted as shown in Figure 8.
Figure 10:
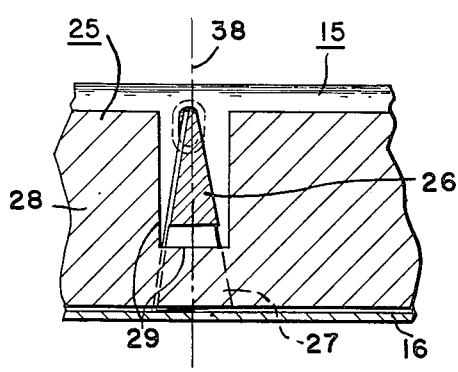
Figure 10 is a sectional view taken on the line 10—10 of Figure 9 further illustrating the shifting of one of the transverse grid walls when the tray is twisted as shown in Figure 8.

The freezing device is filled with water to a lever substantially at the top of walls 26 and 28 therein and is subjected to a below freezing temperature in a refrigerator until the water is hard-frozen. It is to be understood that the clearance between walls of slots 27 and 29 in walls 26 and 28 respectively of the grid 25, in addition to permitting free movement of walls 26 and 28 relative to one another and to the tray, serve to permit the level of water in the device to equalize in all of the ice block forming compartments therein. The freezing device is then removed from the refrigerator and tray 15 thereof is twisted from end to end about its geometric center 35 as shown in Figure 8 of the drawings. This breaks the bond between ice blocks in the device and walls of compartments to free the same from the device and upon rotating or turning tray 15 upside down all the ice blocks will fall out of the same. These released ice blocks are substantially of the shape disclosed in Figure 11 of the drawings. Torsional twisting of the freezing device as illustrated in Figure 8 of the drawings causes one side 17 of tray 15 to move in the direction of the arrow 36 in Figure 9 and the other or opposed side of tray 15 moves in the opposite direction as indicated by the arrow 37. This movement of the sides 17 of tray 15 consequently moves the attaching points, recesses 22 and projections 31 fitted therein, in opposite directions with respect to one another to bodily shift inflexible transverse walls 26 angularly relative to tray 15 in a direction along the length thereof and as indicated by the dot-dash center line 38 in Figure 9 of the drawings. The angular shifting of walls 26 together with twisting of tray 15 as shown in Figure 9 of the drawings also simultaneously swings or rocks the rigid walls 26 about their pivot or anchoring points within the tray as illustrated in Figure 10 of the drawings. The wide base portion of the tapered rigid transverse walls 26 normally rest flat on the bottom wall 16 of tray 15 and the vertical elongation of recesses 22 permit walls 26 to rise within tray 15, while these walls are being bodily shifted angularly therein, and to be tilted, swung or rocked as shown. Thus by virtue of the present construction the inflexible transverse walls of the device are bodily shiftable or movable simultaneously in a plurality of directions fully capable of freeing ice blocks from their compartments by a twisting of the tray in one direction only. However tray 15 may if desired be put to reciprocal torsional twisting movements. It is to be understood that movement of the rigid grid walls as shown in Figures 8, 9 and 10 of the drawings may be somewhat exaggerated for better illustrating the invention.

While I have provided a novel low cost fast freezing unitary freezer device of the tray and grid type of a construction which renders twisting thereof a simple and easy operation primarily capable of being carried out by a housewife, it is to be understood that the principle of the invention disclosed may be incorporated in automatically operated apparatuses such, for example, as continuous or intermittently actuated ice block or cube making machines. In the present freezing device the incorporation of inflexible grid walls loosely disposed in a flexible tray tends to aid the tray in returning to its original position after having been twisted and thus the tray is prevented from taking a permanent set or of becoming permanently deformed. The manner of interlocking walls of the grid of my device to one another and of locking these walls to movable anchoring points along the sides of the tray thereof does not require expensive assembly fixtures or the like.

While the form of embodiment of the invention as herein disclosed constitutes a preferred form, it is to be understood that other forms might be adopted as may come within the scope of the claims which follow.

What is claimed is as follows:

1. A unitary freezing device comprising, an elongated tray capable of being twisted throughout the length thereof, a plurality of spaced apart rigid walls in said tray extending continuously thereacross and dividing the interior thereof into compartments in which water is to be frozen into ice blocks, the ends of said walls having ear-like projections at their top loosely inserted into recesses provided in opposed upright sides of said tray adjacent the upper extremity thereof, the loose attaching points of said walls to said tray forming the sole means of locking said rigid walls in the tray against removal therefrom, and said attaching points along one side of said tray being shiftable with respect to the attaching points along the opposite side of said tray in response to twisting the tray for bodily moving said rigid walls about their loose attaching points relative to said tray while positioned therein to free ice blocks from their compartments.

2. A freezing device as defined in claim 1 wherein the rigid walls are bodily moved in a plurality of directions relative to the tray when the same is twisted.

3. A freezing device as defined in claim 1 wherein at least the tray is formed of metal.

4. A freezing device as defined in claim 1 wherein the upright sides of each of the plurality of rigid walls in the tray are tapered toward one another from their bottom to their top.

5. A freezing device as defined in claim 1 wherein the rigid walls are bodily moved angularly in a direction along the length of the tray and are simultaneously rocked about their attaching points to the tray when the same is twisted.

6. A unitary freezing device comprising, an elongated tray capable of being twisted throughout the length thereof and a grid disposed therein, said grid including a longitudinal wall and a plurality of spaced apart rigid walls unattached to and extending over said longitudinal wall transversely across said tray, said grid walls dividing the interior of said tray into rows of compartments in which water is to be frozen into ice blocks, the ends of said plurality of cross walls having ear-like projections at their top loosely inserted into recesses provided in opposed upright sides of said tray adjacent the upper extremity thereof, the loose attaching points of said rigid cross walls to said tray forming the sole means of locking said grid in the tray against removal therefrom, and said attaching points along one side of said tray being shiftable with respect to the attaching points along the opposite side of said tray in response to twisting the tray for bodily moving said rigid grid cross walls about their loose attaching points relative to said tray and said longitudinal grid wall while the grid is positioned in said tray to free ice blocks from the compartments of said device.

References Cited in the file of this patent

UNITED STATES PATENTS

| | | |
|---|---|---|
| 1,954,224 | Piker | Apr. 10, 1934 |
| 2,265,705 | Steenstrup | Dec. 9, 1941 |
| 2,454,960 | Berkeley | Nov. 30, 1948 |
| 2,481,525 | Mott | Sept. 13, 1949 |
| 2,498,965 | Roethel | Feb. 28, 1950 |
| 2,531,714 | Van Lennep | Nov. 28, 1950 |